United States Patent
Epton

[15] 3,666,733
[45] May 30, 1972

[54] WATER INSOLUBLE HYDROPHILIC POLYMERS OF ACRYLAMIDE POLYMER

[72] Inventor: Roger Epton, Wolverhampton, England

[73] Assignee: Koch-Light Laboratories Limited, Colnbrook Buckinghamshire, England

[22] Filed: Mar. 16, 1970

[21] Appl. No.: 20,021

[30] Foreign Application Priority Data

Mar. 19, 1969 Great Britain......................14,536/69

[52] U.S. Cl. .............................260/80.3 N, 195/63, 195/68, 195/DIG. 11, 260/8, 260/79.5 NV, 260/112, 260/112.5, 260/453, 260/561 N, 424/81
[51] Int. Cl. .................C08f 15/00, C08f 27/06, C08h 19/02
[58] Field of Search..............260/79.5, 80.73, 80.3 N, 112.5; 195/63 P, 63 R, 68; 204/159.22

[56] References Cited

UNITED STATES PATENTS

| | | | |
|---|---|---|---|
| 3,488,329 | 1/1970 | Johnson | 260/78.5 |
| 3,502,545 | 3/1970 | Westman | 195/66 |
| 3,515,657 | 6/1970 | Nakanome | 204/159.24 |
| 3,519,538 | 7/1970 | Messing | 195/63 |
| 3,536,587 | 10/1970 | Stahmann | 195/63 |

OTHER PUBLICATIONS

Szmant, H. H., Organic Chem., Prentice Hall, Inc. (N.J.), 1957, pg. 455.

Primary Examiner—Joseph L. Schofer
Assistant Examiner—C. A. Henderson, Jr.
Attorney—Dowell & Dowell

[57] ABSTRACT

This invention relates to hydrophilic water insoluble polymers, their preparation and the attachment of enzyme molecules to said polymers to render said enzymes water insoluble. The polymers comprise chains having attached thereto repeating primary amide side groupings which make said polymer hydrophilic and other repeating functional side groupings at least some of which are either acid hydrazide groupings or aromatic ammo groupings. These chains of the polymers have been cross-linked so as to make the polymer water insoluble by using bisacrylamides as a comonomer.

2 Claims, No Drawings

3,666,733

WATER INSOLUBLE HYDROPHILIC POLYMERS OF ACRYLAMIDE POLYMER

This invention relates to hydrophilic water insoluble polymers and is especially concerned with polymers which have functional side groupings to which compounds such as enzymes can be attached.

BACKGROUND TO THE INVENTION

Enzymes themselves are normally soluble in water and when they are used to catalyse various reactions it is often difficult and expensive to separate them both from the reaction products and from their own decomposition products. In order to overcome this problem it would be an advantage to find a way of using the enzymes in a form in which they are water insoluble without, of course, affecting their activity.

One way of doing this would be to attach the enzymes to a long chain water insoluble polymer having various functional sites along its chain to which the enzyme molecules can be chamically joined. In so doing, however, one must ensure that the catalytic properties of the enzyme are not altered, i.e., the enzyme must not be joined through any of its catalytically active groupings to the polymer.

It is an object of the invention to provide polymers which are eminently suitable for use in having enzyme molecules linked to them.

THE INVENTION

According to the invention there is provided a hydrophilic water insoluble polymer which comprises chains having attached thereto repeating primary amide side groupings so as to make the polymer hydrophilic and other repeating functional side groupings, the chains being cross-linked so as to make the polymer water insoluble, at least some of the said other repeating functional side groupings being acid hydrazide groupings or aromatic amino groupings.

The primary amide side groupings provide the hydrophilic nature of the polymer and accordingly there will normally be a large number of them. The primary amide side groupings can have been derived from acrylamide although other monomers such as methacrylamide can be used. The cross-linking, on the other hand, makes the polymer water insoluble and there should be sufficient cross-linking to achieve this. The cross-linking can be achieved in any convenient way, for example, with N,N′-methylene-bis-acrylamide linking units or other linking units.

Polymers according to the invention can readily have enzyme molecules attached to their functional side groupings and the polymers with the enzyme molecules attached are insoluble in water, and in many organic solvents including, for example, acetic acid, acetone, benzene, dimethylformamide, dioxan, ethanol, ethyl acetate, methylene dichloride and pyridine. On the other hand the enzyme molecules attached to the polymers can still be used to catalyse various reactions and also the polymers themselves are generally inert to the reactions which the enzymes are used to catalyse. Once the catalytic reaction is complete, the solid enzyme copolymer material can be readily removed from and freed of the reactants and products. Indeed the solid enzyme polymer material can with advantage be used as the active fill of a column down which a mixture of reactants is passed.

An additional advantage of the invention is that when an enzyme molecule is attached to a polymer of the invention, the stability of the enzyme molecule is often improved.

The polymers of the invention can have coupled to them protein molecules other than enzyme molecules, examples of such other protein molecules being antibodies and protein antigens.

In order to join an enzyme molecule to the acid hydrazide side groupings, these may first be activated by converting them to acid azide groupings, by, for example, the action of dilute nitrous acid. Then amino groups of an enzyme or other protein molecule can be readily joined to these acid azide groups. An example of an enzyme which can be joined to the acid hydrazide side groupings after activation to acid azide groups is α-amylase.

In the case of the aromatic amino side groupings enzyme molecules may be joined to them by first activating them by conversion of the groupings to isothiocyano groups, for example, by reaction with thiophosgene, or by diazotisation of the groupings. Then the enzyme molecules can be joined to the activated side groupings. Examples of enzymes which can be joined to the aromatic amino side groupings after activation to isothiocyano groups are α - and β-amylase, and after activation by diazotisation are Carboxypeptidase A and α- and β-amylase.

The type of side groupings and the way in which it is activated before attachment of a particular enzyme is chosen so as to avoid destruction or steric blocking of catalytically active sites on the enzyme molecule.

The units containing the said functional side groupings in the polymer chains can be derived from N-acryloyl-N′-t-butoxy-carbonyl-hydrazine (with subsequent removal of the t-butoxy-carbonyl groups) to give the acid hydrazide side groupings, and from 4-nitroacryloylanilide (with subsequent reduction) to give the aromatic amino side groupings.

In the case of copolymers of acrylamide and 4-nitroacryloylanilide cross-linked with N,N′-methylene-bis-acrylamide a suitable molar ratio of the three monomeric components is approximately 25:1:2, respectively. Such a copolymer can be prepared by heating the three monomer reactants together in the presence of a catalyst such as benzoyl peroxide and then reducing at least some of the nitro groups in the resulting cross-linked copolymer to amino groups by, for example, treatment with titanous chloride in aqueous hydrochloric acid.

In the case of copolymers of acrylamide and N-acryloyl-N′-t-butoxy-carbonyl hydrazine cross linked with N,N′-methylene-bis-acrylamide the three monomeric components should be polymerized in a molar ratio within the range of from 20:5:2 to 25:1:2, respectively. Such a copolymer can be prepared by irradiating with UV light a mixture of the monomeric components in solution in say ethylene glycol. Thereafter, at least some of the t-butoxy-carbonyl groups can be removed so as to leave the acid hydrazide side groupings by, for example, treatment with hydrochloric acid.

EXAMPLES OF PRESENTLY PREFERRED EMBODIMENTS OF THE INVENTION

The invention will now be illustrated with reference to the following Examples, which are not to be construed as in any way limiting the invention.

EXAMPLE 1

Preparation of 4-nitroacryloylanilide p-Nitroaniline (27.6 g, 0.2 mole) was dissolved in dry ether (1 l, the minimum amount). Acryloyl chloride (9.05 g, 8 ml, 0.1 mole) was added and stirring continued for two hours after which a further 1 ml of acryloyl chloride was added. After stirring for a further two hours the crystals were separated off and the ether evaporated when more solid was obtained. The crystals and solid were combined and extracted five times with water (500 ml each time) at 80° to 85° C. The residue was 4-nitroacryloylanilide and was recrystallized from acetone. The yield was 10.5 g, 54 percent, and its melting point was 224°–226° C.

Preparation of copolymer of acrylamide, N,N′-methylene-bis-acrylamide, and 4-nitroacryloyl anilide Acrylamide (3.55 g, 0.05 mole), N,N′-methylene-bis-acrylamide (0.616 g, 0.004 mole) and 4-nitroacryloylanilide (0.38 g, 0.002 mole) were dissolved directly in ethanol (25 ml) at 75° C. The solution was purged gently with nitrogen for 20 minutes and a solution of benzoyl peroxide (approx. 100 mg) in chloroform (1 ml) added. The tube was stoppered and maintained for twelve hours at 75° C. The resulting copolymer was then broken up roughly under ethanol and passed through a coarse syringe needle. The copolymer was then washed three times with near boiling ethanol (500 ml each time). It was necessary to collect the polymer by centrifugation each time. This copolymer is hereinafter called Copolymer A.

Reduction of Copolymer A

The dried Copolymer A (2 g) was suspended in titanous chloride solution (100 ml, 5-6 percent in 6N HCl and filtered prior to use) and quickly raised to 100° C. The mixture was maintained at 100° C for five minutes after which it was rapidly cooled (ice-bath) and most of the solution decanted. The polymer was repeatedly washed with distilled water (the polymer being recovered by centrifugation each time) until free of titanous salts. Finally the copolymer was made into a slurry with water, ground gently and passed through a coarse syringe needle, washed with acetone and allowed to dry in air.

The resulting reduced copolymer was copolyacrylamide/ N,N'-methylene-bis-acrylamide/4-aminoacrylanilide, and had aromatic amino side groupings.

The polymer also contained carboxylate residues owing to hydrolysis during the reduction step.

EXAMPLE 2

Preparation of N-acryloyl-N'-tert-butoxycarbonyl hydrazine t-Butylcarbazate (2.6 g, 0.02 mole) was dissolved in distilled water (15 ml) at room temperature and sodium bicarbonate (6 g) added. The mixture was stirred vigorously and acryloyl chloride (1.8 g, 2.05 ml), 0.02 mole) added over 5 minutes. The solution was stirred for 30 minutes and a further aliquot of acryloyl chloride (1 ml) added. After a further 30 minutes of stirring, the white solid was filtered off and washed well with water. This was recrystallized from an ethyl acetate/petroleum ether 40°-60° C mixture. The yield was 1.8 g, 50 percent, and melting point 159°-160° C.

This reaction is readily adaptable to large scale.

Preparation of copolymer of acrylamide, N,N'-methylene-bis-acrylamide, and N-acryloyl-N'-t-butoxycarbonyl hydrazine molar ratio 25:2:1, respectively Acrylamide (3.55 g, 0.05 mole), N,N'-methylene-bis-acrylamide (0.616 g, 0.004 mole) and N-acryloyl-N'-t-butoxycarbonyl hydrazine (0.372 g, 0.002 mole) were dissolved in ethylene glycol (25 ml) and irradiated for 20 hours with a UV lamp. The resulting block of copolymer was broken and ground and then washed first with water and then with acetone. The copolymer had excellent rigidity and swelled slightly in water. The copolymer is hereinafter called Copolymer B.

Deprotection of Copolymer B

Copolymer B was deprotected by shaking with an excess of 2N hydrochloric acid for 4 days at room temperature. Some swelling occurred but the copolymer still had good rigidity. Finally the polymer was washed with distilled water, shrunk by dropwise addition of acetone and allowed to dry in air.

The deprotected copolymer thus obtained contained in addition to amide groups, carboxylate groups (produced by hydrolysis of amide) and acid hydrazide groups (produced by removal of at least some of the t-butoxy-carbonyl groups).

EXAMPLE 3

Activation and coupling of Copolymer A

Copolymer A (100 mg) was weighed into a plastic centrifuge tube and stirred magnetically with dilute HCl (2N, 5 ml) at 0° C. Ice-cold sodium nitrite solution (2 percent by weight, 4 ml) was added. Stirring was continued for 15 minutes after which the product was washed four times with an appropriate buffer (phosphate, pH 7.5) for enzyme coupling. After centrifuging and decanting the washings an enzyme (2.5 mg) in an appropriate buffer (0.5 ml) was added. Coupling was allowed to proceed with magnetic stirring for 48 h. An ice-cold solution of phenol (0.01 percent by weight) in sodium acetate (10 percent by weight) was added. After a further 15 minutes the copolymer with coupled enzyme was washed with dilute buffer (of pH corresponding to that for maximum enzyme activity) followed by a solution of NaCl (0.5 M) in the same buffer. Each washing took 20 minutes with vigorous magnetic stirring. A control experiment was performed in which non-diazotised copolymer was put through the coupling and washing procedures. The washing cycle was repeated several times until no activity was detected in the washings or in the control copolymer suspension.

EXAMPLE 4

Activation and coupling of Copolymer A

Copolymer A (100 mg) was stirred magnetically with phosphate buffer (3.5 M, pH 6.8-7.0, 1.0 ml) until a thick suspension was obtained. Thiophosgene (10 percent by weight) in chloroform (0.2 ml) was added with vigorous magnetic stirring which was maintained for 20 minutes. A further aliquot of thiophosgene solution (0.2 ml) was then added and 20 minutes later the product was washed once with acetone, twice with NaHCO$_3$ solution (0.5 M) and twice with a buffer (borate pH 8.5) appropriate to enzyme coupling. After centrifuging and decanting the final washings an enzyme (2.5 mg) in the appropriate buffer (0.5 ml) was added. Coupling was allowed to proceed for 48 h after which the copolymer with coupled enzyme was subjected to the washing procedure described previously. A control experiment was advisable in which non-thiophosgene treated copolymer was used as described in Example 3 above.

EXAMPLE 5

Activation and coupling of Copolymer B

Copolymer B (100 mg) was treated with nitrous acid in exactly the way Copolymer A was treated in Example 3. The product thus produced was washed with a buffer appropriate to enzyme coupling (borate, pH 8.5). The subsequent coupling to an enzyme and washing procedures are similar to those described in Example 4.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

I claim:

1. A hydrophilic water insoluble copolymer consisting of acrylamide, 4-nitroacryloylanilide and N,N'-methylene-bis-acrylamide units in a molar ratio of approximately 25:1:2, respectively, said copolymer comprising chains of carbon atoms derived from said repeating acrylamide, 4-nitroacryloylanilide and N,N'-methylene-bis-acrylamide units, said chains being cross-linked to one another by said N,N'-methylene-bis-acrylamide units so as to make said polymer water insoluble, and aromatic amino groupings being bonded to carbon atoms in said chains which have been derived from said 4-nitroacryloylanilide units.

2. A hydophilic water insoluble copolymer consisting of acrylamide, N,N'-methylene-bis-acrylamide and N-acryloyl-N'-t-butoxy-carbonyl-hydrazine units in a molar ratio of from 20:5:2 to 25:1:2, respectively, said copolymer comprising chains of carbon atoms derived from said repeating acrylamide, N,N'-methylene-bis-acrylamide and N-acryloyl-N'-t-butoxy-carbonyl-hydrazine units, said chains being cross-linked to one another by said N,N'-methylene-bis-acrylamide units so as to make said polymer water insoluble and acid hydrazide groupings derived from said N-acryloyl-N'-t-butoxy-carbonyl-hydrazine units being bonded to carbon atoms in said chains which have been derived from said N-acryloyl-N'-t-butoxy-carbonyl-hydrazine units.

* * * * *